United States Patent
Schabert

(10) Patent No.: US 12,551,279 B2
(45) Date of Patent: Feb. 17, 2026

(54) LITHOTRIPSY BALLOON CATHETER

(71) Applicant: Acotec Technologies Limited, San Jose, CA (US)

(72) Inventor: Jon Schabert, San Jose, CA (US)

(73) Assignee: Acotec Technologies Limited, San Jose, CA (US)

( * ) Notice: Subject to any disclaimer, the term of this patent is extended or adjusted under 35 U.S.C. 154(b) by 226 days.

(21) Appl. No.: 18/470,132

(22) Filed: Sep. 19, 2023

(65) Prior Publication Data
US 2024/0099773 A1 Mar. 28, 2024

Related U.S. Application Data

(60) Provisional application No. 63/410,623, filed on Sep. 28, 2022.

(51) Int. Cl.
A61B 18/26 (2006.01)
A61B 17/22 (2006.01)
A61B 18/00 (2006.01)

(52) U.S. Cl.
CPC ........ *A61B 18/26* (2013.01); *A61B 17/22022* (2013.01); *A61B 2017/22025* (2013.01); *A61B 2017/22062* (2013.01); *A61B 2018/0022* (2013.01); *A61B 2018/266* (2013.01)

(58) Field of Classification Search
CPC .............. A61B 18/26; A61B 17/22022; A61B 2017/22025; A61B 2017/22062; A61B 2018/0022; A61B 2018/266
See application file for complete search history.

(56) References Cited

U.S. PATENT DOCUMENTS

| | | |
|---|---|---|
| 8,574,247 B2 | 11/2013 | Adams |
| 8,684,970 B1 | 4/2014 | Koyfman |
| 8,900,166 B2 | 12/2014 | Spector |
| 8,956,374 B2 | 2/2015 | Hawkins |
| 9,044,619 B2 | 6/2015 | Hawkins |
| 9,072,534 B2 | 7/2015 | Adams |
| 9,180,280 B2 | 11/2015 | Hawkins |
| 11,020,135 B1 | 6/2021 | Hawkins |
| 11,534,187 B2 | 12/2022 | Bonutti |
| 11,633,200 B2 | 4/2023 | Anderson et al. |
| 2009/0312768 A1 | 12/2009 | Hawkins |
| 2012/0157891 A1 | 6/2012 | Ein-Gal |
| 2013/0018287 A1 | 1/2013 | Capelli |
| 2014/0005576 A1 | 1/2014 | Adams |
| 2014/0039513 A1 | 2/2014 | Hakala |
| 2014/0046229 A1 | 2/2014 | Hawkins |
| 2014/0046353 A1 | 2/2014 | Adams |

(Continued)

*Primary Examiner* — Sarah A Long
*Assistant Examiner* — James R McGinnity
(74) *Attorney, Agent, or Firm* — Acotec IP

(57) ABSTRACT

A lithotripsy device includes an elongate body comprising a distal tip portion having an end surface that forms a non-zero angle with a longitudinal axis of the elongate body, a balloon circumferentially around a portion of the elongate body enclosing the end surface of the tip portion defining an interior configured to receive a fluid, and at least one emitter positioned at the end surface of the tip portion of the elongate body. The at least one emitter is configured to generate pressure waves in the fluid propagating through the balloon to disintegrate a calcified lesion. A method of using a lithotripsy device is also provided.

15 Claims, 4 Drawing Sheets

(56) References Cited

U.S. PATENT DOCUMENTS

| | | |
|---|---|---|
| 2014/0052145 A1 | 2/2014 | Adams |
| 2014/0074113 A1 | 3/2014 | Hakala |
| 2014/0163592 A1 | 6/2014 | Hawkins |
| 2014/0288570 A1 | 9/2014 | Adams |
| 2015/0039002 A1 | 2/2015 | Hawkins |
| 2015/0320432 A1 | 11/2015 | Adams |
| 2016/0135828 A1 | 5/2016 | Hawkins |
| 2017/0135709 A1 | 5/2017 | Nguyen |
| 2017/0303946 A1 | 10/2017 | Ku |
| 2018/0098779 A1 | 4/2018 | Betelia |
| 2018/0153568 A1 | 6/2018 | Kat-Kuoy |
| 2018/0303501 A1 | 10/2018 | Hawkins |
| 2018/0360482 A1* | 12/2018 | Nguyen ............ A61B 17/22022 |
| 2019/0150960 A1 | 5/2019 | Nguyen |
| 2019/0150961 A1 | 5/2019 | Tozzi |
| 2019/0321061 A1 | 10/2019 | Panian |
| 2019/0365400 A1 | 12/2019 | Adams |
| 2019/0388110 A1 | 12/2019 | Nguyen |
| 2020/0022715 A1 | 1/2020 | Kassab |
| 2020/0129195 A1* | 4/2020 | McGowan ............. A61B 18/26 |
| 2021/0085347 A1 | 3/2021 | Phan |
| 2021/0085348 A1 | 3/2021 | Nguyen |
| 2021/0085383 A1 | 3/2021 | Vo |
| 2021/0259860 A1 | 8/2021 | Walzman |
| 2021/0308001 A1 | 10/2021 | Cioanta |
| 2022/0054119 A1 | 2/2022 | Walzman |
| 2022/0125453 A1 | 4/2022 | Nguyen |
| 2022/0183708 A1 | 6/2022 | Phan |
| 2022/0183756 A1 | 6/2022 | Milne |
| 2023/0037716 A1 | 2/2023 | Batchelder |
| 2023/0038308 A1 | 2/2023 | Batchelder |
| 2023/0038388 A1 | 2/2023 | Batchelder |
| 2023/0038663 A1 | 2/2023 | Batchelder |
| 2023/0040190 A1 | 2/2023 | Batchelder |
| 2023/0040420 A1 | 2/2023 | Batchelder |
| 2023/0041407 A1 | 2/2023 | Batchelder |
| 2023/0044926 A1 | 2/2023 | Batchelder |
| 2023/0107690 A1 | 4/2023 | Nguyen |
| 2023/0123003 A1 | 4/2023 | Vo |
| 2023/0165598 A1 | 6/2023 | Nguyen |
| 2023/0405364 A1* | 12/2023 | Mashal ................ A61B 8/4494 |
| 2024/0065711 A1* | 2/2024 | Hendrickson ...... A61B 17/2202 |

* cited by examiner

LITHOTRIPSY BALLOON CATHETER

TECHNICAL FIELD

This application relates generally to medical devices and methods of using medical devices. In particular, various embodiments of a lithotripsy balloon catheter and a method of disintegrating calcified lesions are described.

BACKGROUND

Calcified lesions can occur in various parts of the human body, including the blood vessels, organs, soft tissues, and bones. Depending on the location and severity, calcified lesions can lead to pain, inflammation, and other diseases. For instance, calcified lesions in blood vessels can lead to atherosclerosis or hardening of the arteries, a condition that can increase the risk of heart attack, stroke, and other health problems. Chronic total occlusion (CTO) is a complete blockage of a blood vessel caused by a buildup of plaque and other materials within the vessel walls. CTOs can cause heart attack, sudden cardiac death, heart failure, and stroke, imposing severe and/or long-term effects on the patients.

Lithotripsy devices are known and have been used to treat diseases associated with calcified lesions. Conventional lithotripsy devices include a balloon catheter and utilize shock waves to break up calcified lesions. For instance, in an angioplasty procedure, a balloon catheter is inserted into an affected vessel and the balloon is inflated to compress the plaque against the vessel wall. Then high-frequency shock waves are generated and delivered to the plaque, causing the plaque to break up into small parts that can be more easily absorbed by the body. The balloon is then deflated and removed from the vessel. However, conventional lithotripsy balloon catheters cannot be used to treat CTOs because they cannot cross the hardened mass of CTOs, and thus cannot deliver high frequency shock waves from inside of the plaque to break it into smaller pieces.

Therefore, there remains a need for improved lithotripsy devices for treatment of diseases associated with calcified lesions especially CTOs. It would be desirable to provide a lithotripsy balloon catheter that can deliver high frequency pressure waves propagating in either forward and lateral directions, and thus allowing a single device to treat CTOs.

SUMMARY

In one aspect, embodiments of the disclosure feature a lithotripsy device. In general, an embodiment of the lithotripsy device comprises an elongate body comprising a distal tip portion having an end surface that forms a non-zero angle with a longitudinal axis of the elongate body, a balloon circumferentially around a portion of the elongate body enclosing the end surface of the tip portion defining an interior configured to receive a fluid, and at least one emitter positioned at the end surface of the tip portion of the elongate body. The at least one emitter is configured to generate pressure waves in the fluid propagating through the balloon to disintegrate a calcified lesion.

In various embodiments of the aspect, the end surface of the tip portion comprises a first end surface and a second end surface generally symmetrical with the first end surface, and the at least one emitter comprises a first emitter positioned at the first end surface and a second emitter positioned at the second end surface.

In various embodiments of the aspect, the non-zero angle formed between the end surface and the longitudinal axis ranges from 20 to 70 degrees.

In various embodiments of the aspect, the elongate body comprises a tubular body having an inner surface defining a lumen, and the balloon comprises a distal end portion secured to the inner surface of the tubular body. The distal end portion of the balloon can form a seal circumferentially around the inner surface configured to fluid-tight seal an elongate member positioned within the seal. The balloon may be forwardly and radially expandable when inflated with the fluid. The tubular body may further comprise a generally cylindrical portion adjacent to the tip portion. The generally cylindrical portion may have an outer surface enclosed by the balloon, and the lithotripsy device further may comprise one or more emitters positioned at the outer surface of the generally cylindrical portion configured to generate pressure waves in the fluid. The at least one emitter positioned at the end surface of the tip portion may be controlled independently of the one or more emitters positioned at the outer surface of the generally cylindrical portion.

In various embodiments of the aspect, the elongate body may comprise a tubular body having an inner surface defining a lumen and an outer surface, the balloon may comprise a distal end portion, a proximal end portion, and a distensible portion. The distal end portion of the balloon may be secured to the inner surface of the tubular body and the proximal end portion secured to the outer surface of the tubular body.

In various embodiments of the aspect, the elongate body may comprise a tubular body having an inner surface defining a first lumen and an outer surface. The balloon may comprise a distal end portion, a proximal end portion, and a distensible portion. The distal end portion may be secured to the inner surface of the tubular body and the proximal end portion secured to the outer surface of the tubular body. The tubular body may further comprise a second lumen in fluid communication with the interior defined by the balloon. The second lumen may be an annular lumen surrounding at least a portion of the first lumen.

In various embodiments of the aspect, the elongate body may comprise a tubular body having an inner surface defining a lumen with a diameter ranging from 0.017 inches to 0.042 inches.

In a further aspect, embodiments of the disclosure feature a lithotripsy device. In general, an embodiment of the lithotripsy device comprises an elongate tubular body comprising a distal tip portion having an end surface that forms a non-zero angle with a longitudinal axis of the tubular body and a generally cylindrical portion adjacent to the tip portion, a balloon circumferentially around a portion of the tubular body enclosing the tip portion and the generally cylindrical portion defining an interior configured to receive a fluid, and at least one emitter positioned at the end surface of the tip portion and one or more emitters positioned at an outer surface of the generally cylindrical portion. The at least one emitter and the one or more emitters are configured to generate pressure waves in the fluid propagating through the balloon to disintegrate a calcified lesion.

In various embodiments of the aspect, the at least one emitter positioned at the end surface of the tip portion can be controlled independently of the one or more emitters positioned at the outer surface of the generally cylindrical portion.

In various embodiments of the aspect, the elongate body may comprise a tubular body having an inner surface defining a lumen and an outer surface. The balloon may comprise a distal end portion, a proximal end portion, and a distensible portion. The distal end portion may be secured to the inner surface of the tubular body and the proximal end portion secured to the outer surface of the tubular body.

In various embodiments of the aspect, the elongate body may comprise a tubular body having an inner surface defining a first lumen and an outer surface. The balloon may comprise a distal end portion, a proximal end portion, and a distensible portion. The distal end portion of the balloon may be secured to the inner surface of the tubular body and the proximal end portion of the balloon secured to the outer surface of the tubular body. The tubular body may further comprise a second lumen in fluid communication with the interior defined by the balloon.

In various embodiments of the aspect, the distal end portion of the balloon may be secured to the inner surface of the tubular body.

In a further aspect, embodiments of the disclosure feature a method. In an embodiment of the method, a lithotripsy device is introduced into a patient. The lithotripsy device comprises an elongate tubular body comprising a tip portion having an end surface that forms a non-zero angle with a longitudinal axis of the tubular body and a generally cylindrical portion adjacent to the tip portion, a balloon circumferentially around a portion of the tubular body and enclosing the tip portion and the generally cylindrical portion defining an interior configured to receive a fluid, and at least one emitter positioned at the end surface of the tip portion and one or more emitters positioned at an outer surface of the generally cylindrical portion. The at least one emitter and the one or more emitters being configured to generate pressure waves in the fluid. According to the method, the lithotripsy device is advanced to position the at least one emitter adjacent to a proximal end of a calcified lesion in an anatomy of the patient. Then, a first decalcifying step is conducted using the at least one emitter at the end surface of the tip portion to disintegrate or soften at least a portion of the calcified lesion. The lithotripsy device is further advanced to position at least one of the one or more emitters at the outer surface of the generally cylindrical portion inside the calcified lesion, and a second decalcifying step is conducted using the at least one of the one or more emitters at the outer surface of the generally cylindrical portion to disintegrate the calcified lesion.

In various embodiments of the aspect, the first decalcifying step and the second decalcifying step are conducted in a lithotripsy procedure to break a calcified occlusion in a vasculature of the patient.

In various embodiments of the aspect, the first decalcifying step and the second decalcifying step are conducted in a lithotripsy procedure to break a calcified occlusion in the kidney or the ureter of the patient.

This Summary is provided to introduce selected aspects and embodiments of this disclosure in a simplified form and is not intended to identify key features or essential characteristics of the claimed subject matter, nor is it intended to be used as an aid in determining the scope of the claimed subject matter. The selected aspects and embodiments are presented merely to provide the reader with a brief summary of certain forms the invention might take and are not intended to limit the scope of the invention. Other aspects and embodiments of the disclosure are described in the section of Detailed Description.

These and various other aspects, embodiments, features, and advantages of the disclosure will become better understood upon reading of the following detailed description in conjunction with the accompanying drawings.

DETAILED DESCRIPTION OF EMBODIMENTS

Figure 1:
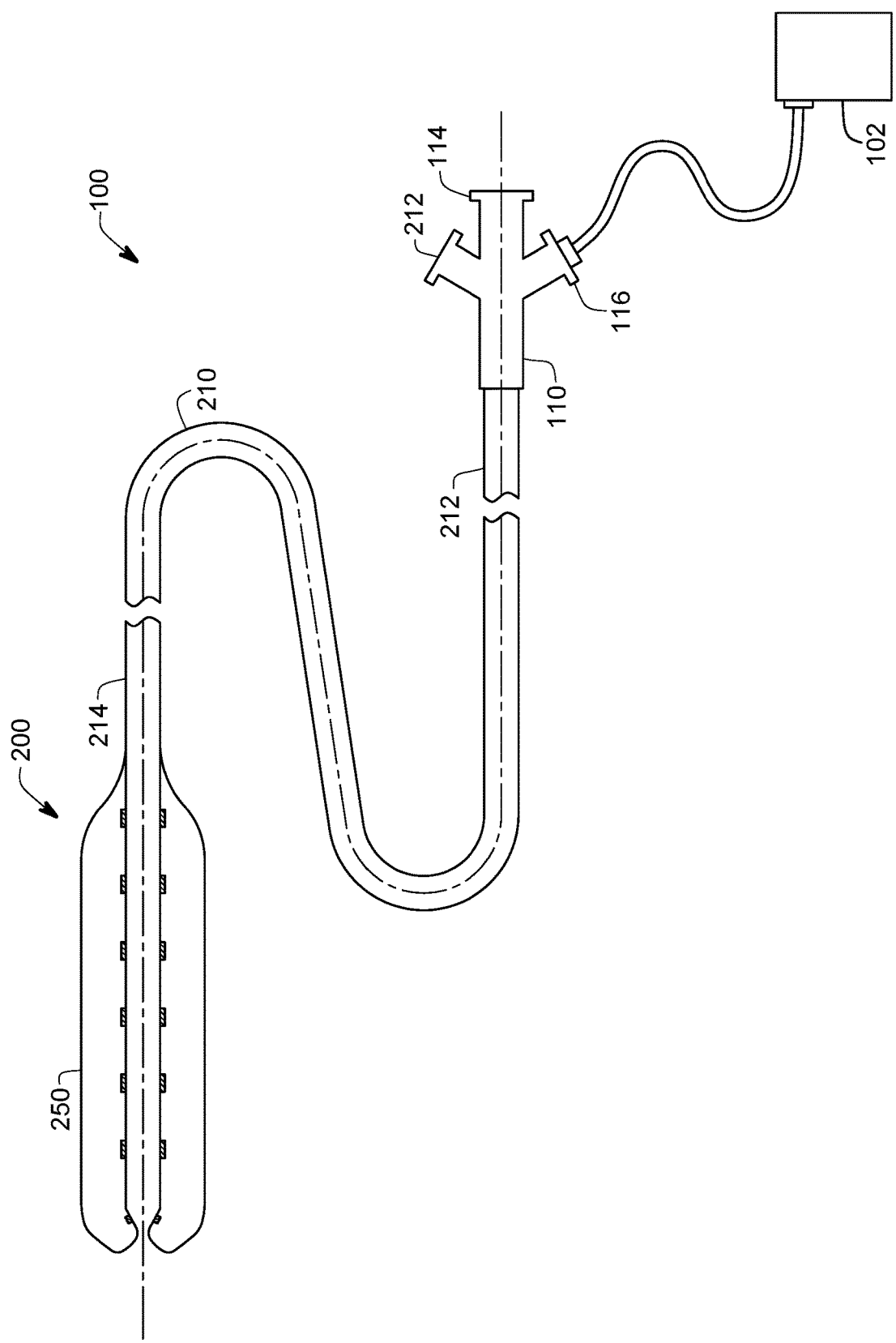
FIG. 1 illustrates an example lithotripsy system according to embodiments of the disclosure.

With reference to the figures, various embodiments of lithotripsy device, system, and method will be described. The figures are intended to facilitate description of embodiments of the disclosure and are not necessarily drawn to scale. Certain specific details may be set forth in the figures and description to provide a thorough understanding of the disclosure. It will be apparent to one of ordinary skill in the art that some of these specific details may not be employed to practice embodiments of the disclosure. In other instances, structures, materials, components, systems, and/or operations often associated with medical procedures may not be shown or described in detail to avoid unnecessarily obscuring description of embodiments of the disclosure.

Embodiments of the disclosure provide a lithotripsy balloon catheter that includes both forward-facing emitters and side-facing emitters. The forward-facing emitters can generate pressure waves in a fluid propagating primarily in the direction along the longitudinal axis of the balloon catheter, whereas the side-facing emitters can generate pressure waves in the fluid propagating primarily laterally with respect to the longitudinal axis of the balloon catheter. Therefore, the lithotripsy device of the disclosure allows for both forward-facing lithotripsy and side-facing lithotripsy using a single device. The lithotripsy balloon catheter of the disclosure is particularly useful in treatment of chronic total occlusions (CTOs). The forward-facing emitters can be used to soften the CTOs, allowing the balloon catheter to cross the lesion and then treat it again with the side-facing emitters. The forward-facing emitters and side-facing emitters can be separately or independently controlled to allow for selective treatment of the front and the side of a calcified lesion. Conventional lithotripsy balloon catheters can only be used to treat calcified lesions that the balloon can cross. Conventional lithotripsy balloon catheters cannot be used to treat CTOs.

As used herein, the term "lithotripsy" broadly refers to a medical procedure using pressure waves generated by pressure-wave emitters to break, disintegrate, or soften a calcified lesion in an anatomy of a patient. The calcified lesion can be located at any anatomy in the patient, including but not limited to, a treatment site in a vasculature such as neuro vasculature, coronary vasculature, peripheral vasculature, in body organs such as the kidneys, uterus, pelvis, and on soft tissues such as breasts. Therefore, the "lithotripsy" device or system described and claimed herein is not limited to treating a calcified lesion at a particular target site such as the kidneys, uterus, but rather can be used or adapted to be used for treating a calcified lesion in any anatomy of a patient.

As used herein, the term "emitter" refers to a device which can receive energy and generate pressure waves in a fluid propagating through a balloon to a treatment site. By way of example, an emitter may include a first electrode and a second electrode connected to an energy source via conductive wires. While not intended to limit the disclosure to a particular theory, it is believed that when the electrodes receive high electrical voltages from an energy source, electrical arcs or sparks are produced between the electrodes, generating pressure waves in the fluid. Variable high voltage pulses may be delivered to the electrodes to generate a stream of pressure waves in the fluid, which propagates through the balloon to a treatment site to disintegrate a calcified lesion. In another example, an emitter may be constructed to receive optical energy such as light signal from an energy source via fiber-optic wires or tubes and transmit the optical energy to generate pressure waves. As used herein, the term "emitter" may refer to an individual emitter which can be controlled independently of other emitters on the lithotripsy device, or an individual unit in an emitter array or assembly operated as a whole.

With reference to FIG. 1, embodiments of an example lithotripsy system 100 of the disclosure are now described. In general, the lithotripsy system 100 includes an energy source 102 and a lithotripsy device 200 coupled to the energy source 102 via a suitable cable and connectors. The energy source 102 provides energy to the lithotripsy device 200 to perform a lithotripsy procedure. The lithotripsy device 200 in general includes an elongate body 210 and a balloon 250 circumferentially around a portion of the elongate body. The elongated body 210 comprises a proximal end portion 212, and a distal end portion 214 constructed or configured to navigate a tortuous anatomy in a patient to a treatment site e.g., a calcified lesion in a vasculature of a patient. The balloon 250 can be constructed from a polymeric material and inflated by a fluid. One or more emitters (e.g., 280 or 282 in FIG. 2) are carried by the distal end portion 214 of the elongate body 210 and enclosed within the balloon 250. The one or more emitters are electrically or optically connected to the energy source 102 and configured to generate pressure waves in the fluid propagating through the balloon 250 to soften, break, or disintegrate a calcified legion. A hub member 110 can be coupled to the proximal end portion 212 of the elongate body 210, providing e.g., a port 112 for introducing a fluid to inflate the balloon 250, a port 114 for receiving a guidewire for guiding the catheter device 200 to a treatment site, and a port 116 for connecting the emitters of the lithotripsy device 200 to the energy source 102. The energy source 102 may comprise an electric energy source. By way of example, the energy source 102 may include a high voltage pulse generator which can delivery variable high voltage pulses to electrical-based emitters. Alternatively, the energy source 102 may comprise an optical energy source which can transmit high energy laser beams to optical-based emitters.

Figure 2:
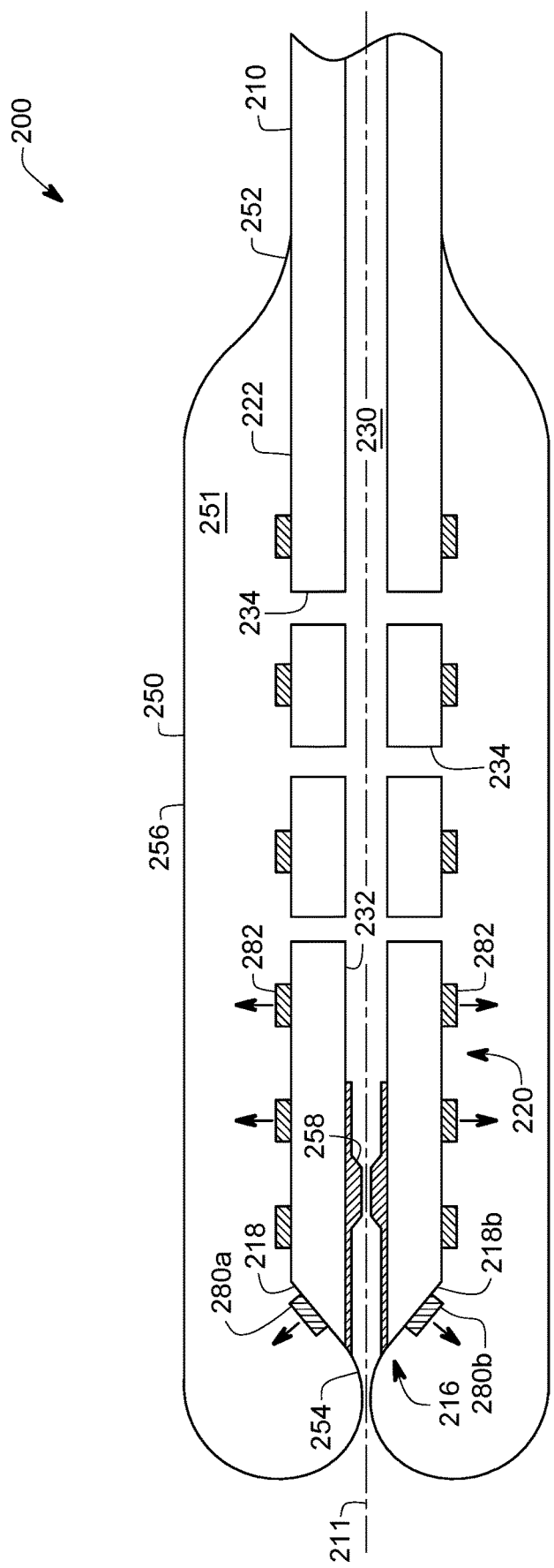
FIG. 2 illustrates a therapeutic end portion of an example lithotripsy device according to embodiments of the disclosure.

With reference to FIG. 2, an example lithotripsy device 200 according to embodiments of the disclosure is now described. FIG. 2 illustrates an enlarged view of the therapeutic portion or distal end portion of the lithotripsy device 200. As shown, the lithotripsy device 200 comprises an elongate body 210 having a tip or tip portion 216 carrying at least one emitter 280. The tip portion 216 can be cut or shaped such that the end surface or surfaces 218 of the tip portion 216 form a non-zero angle with respect to the longitudinal axis 211 of the elongate body 210. At least one emitter 280 can be positioned at the one or more end surfaces 218 of the tip portion 216. The at least one emitter 280 positioned at the end surface or surfaces 218 of the tip portion 216 can produce a stream of pressure waves flowing or propagating generally in a forward direction, or in a direction at an acute angle with respect to the longitudinal axis 211 of the elongate body 210 ("forward-facing emitter"), as indicated by the arrows in FIG. 2. The propagating direction of the pressure waves generated by the emitter(s) 280 depends at least partially on the non-zero angle of the end surface(s) 218 on which or in which the emitter(s) 280 is (are) positioned. The elongate body 210 may include a distal tip portion 216 which is cut or shaped to provide one, two, three, or more end surfaces 218 each having a plane that forms a non-zero angle with respect to the longitudinal axis 211 of the elongate body 210. An example tip portion 216 shown in FIG. 2 includes a first end surface 218a and a second end surface 218b. A first emitter 280a is positioned at the first end surface 218a and a second emitter 280b positioned at the second end surface 218b. To simplify illustration, two emitters 280a, 280b at two end surface 218a, 218b of the tip portion 216 are shown in FIG. 2. It is apparent that more or less than two emitters can be provided in more or less than two end surfaces of the tip portion 216 of the elongate body 210. The end surfaces 218a, 218b of the tip portion 216 may be symmetrically arranged with respect to the longitudinal axis 211 of the elongate body 210. The non-zero angle between an end surface 280 of the tip portion 216 and the longitudinal axis 211 of the elongate body 210 may range from 20 degrees to 70 degrees. By way of example, the non-zero angle between an end surface 218a or 218b of the tip portion 216 and the longitudinal axis 211 of the elongate body may be 20 degrees, 25 degrees, 30 degrees, 35 degrees, 40 degrees, 45 degrees, 50 degrees, 55 degrees, 60 degrees, 65 degrees, 70 degrees, or any degrees between the above stated angles.

With reference to FIG. 2, the elongate body 210 may comprise a generally cylindrical portion 220 adjacent to the tip portion 216. One or more emitters 282 may be positioned on or in the outer surface 222 of the generally cylindrical portion 220. The one or more emitters 282 positioned on the outer surface of the generally cylindrical portion 220 of the elongate body 210 can produce a stream of pressure waves flowing or propagating generally in a lateral direction or in a direction generally normal to the longitudinal axis 211 of the elongate body 210 ("side-facing emitter"), as indicated by the arrows. For illustration purpose, twelve emitters 282 on or in the outer surface 222 of the generally cylindrical portion 220 are shown in FIG. 2. It is apparent that more or less than twelve emitters 282 can be carried by the generally cylindrical portion 220 of the elongate body 210.

With reference to FIG. 2, the forward-facing emitters 280 at the distal tip portion 216 and the side-facing emitters 282 at the generally cylindrical portion 220 can be independently controlled. This can be achieved by programming the energy source 102 in delivering e.g., electrical voltage pulses to the forward-facing emitters 280 and to the side-facing emitters 282 respectively, or by separating or independently controlling the electrical connection for the forward-facing emitters 280 and the electrical connection for the side-facing emitters 282, or by any other suitable means. As such, the lithotripsy device 200 of the disclosure can be used to perform sequential decalcifying steps or stages to a calcified lesion with a single device. For example, a first decalcifying stage to the proximal end portion of a calcified lesion can be performed using the forward-facing emitter(s) 280 at the distal tip portion 216 of the elongate body 210 by positioning the device 200 proximate to the calcified legion, and a second or subsequent decalcifying stage can be performed using the side-facing emitter(s) 282 at the cylindrical portion 220 of the elongate body 210 by positioning the device 200 inside the calcified lesion.

With reference to FIG. 2, the elongate body 210 can be or include a tubular body or catheter having a lumen 230 extending between a proximal end portion 212 and a distal end portion 214 (FIG. 1). Alternatively, the elongate body 210 can comprise a non-tubular body or solid shaft extending at least a portion of the elongate body. According to embodiments of the disclosure, multiple conduits, or passages 234 in the wall of the tubular body 210 can be provided. The multiple conduits or passages 234 allow a fluid to be injected into and/or exit the interior 251 of the balloon 250 through the lumen 230 of the tubular body 210 for inflation and/or deflation of the balloon 250. By way of example, the lumen 230 of the elongate body 210 may have a diameter ranging from 0.017 inches to 0.042 inches, such as 0.017 inches, 0.021 inches, 0.027 inches, 0.038 inches, 0.042 inches, or any diameter between the stated figures.

While not shown in FIG. 2, the elongate body 210 may be constructed to provide features for retaining the emitters 280, 282 or an assembly of emitters. For example, the elongate body 210 may include elongate grooves in the outer surface of the elongate body configured to receive wires, cables, or electrodes. In other examples, the elongate body 210 may have features or retain parts that constitute components of the emitters. For example, the elongate body 210 may retain one or more rings, bands, sheaths, or the like, which can function as electrode components.

With reference to FIG. 2, the balloon 250 circumferentially surrounds a portion of the elongate body 210 e.g., the distal tip portion 216 and the generally cylindrical portion 220. The balloon 250 encompasses or encloses the forward-facing emitter(s) 280 at the tip portion 216 and the side-facing emitter(s) 282 at the generally cylindrical portion 220. The balloon 250 defines an interior or volume 251 for receiving a fluid such as saline or a mixture containing a contrast agent. The balloon 250 can be constructed from a flexible polymeric material and configured to expand both radially and forwardly (pouch or bulge out) when inflated by a fluid in operation. As such, the balloon 250 in an inflated or expanded state may contact or gently pressure against a treatment site such as a calcified lesion in a blood vessel, either from the proximal end of the calcified lesion, or laterally from inside the calcified lesion. This allows for a first decalcifying stage or procedure on the proximal end of a calcified lesion using the forward-facing emitters 280 and a subsequent decalcifying stage or procedure on the calcified lesion using the side-facing emitters 282 from inside of the calcified lesion with a single device, as will be described further below.

With reference to FIG. 2, the balloon 250 comprises a proximal end portion 252, a distal end portion 254, and a middle or distensible portion 256. The proximal end portion 252 of the balloon 250 may be secured to the elongate body 210 e.g., the outer surface 222 of the elongate body 210 via e.g., bonding, or other suitable means. The distal end portion 254 of the balloon 250 may be secured to the tip portion 216 of the elongate body 210 via e.g., bonding, or other suitable means. According to embodiments of the disclosure, the elongate body 210 may comprise a tubular body having a lumen 230 defined by the inner surface 232 of the tubular body 210. As such, the distal end portion 254 of the balloon 250 may be secured to the inner surface 232 of the tubular body 210. Having the distal end portion 254 of the balloon 250 secured to the inner surface 232 of the tubular body 210 can facilitate positioning of one or more forward-facing emitters 280 at the tip portion 216 and enclosing or enveloping of the forward-facing emitters 280 by the balloon 250. When the balloon 250 is inflated in operation, the fluid present between the end surface 218 of the tip portion 216 and the pouched or bulged out balloon 250 allows the pressure waves generated by the forward-facing emitters 280 to propagate forward, or in a direction at an acute angle with respect to the longitudinal axis 211 of the elongate body 210, to perform a lithotripsy procedure e.g., on the proximal end portion of a calcified legion.

With reference to FIG. 2, according to embodiments of the disclosure, a seal 258 can be provided circumferentially around the inner surface 232 of the tubular body 210. The seal 258 can be configured to fluid-tight seal an elongate member such as a guide wire, catheter, or other device (not shown in FIG. 2) positioned within the seal 258. When an inner elongate member is positioned or received in the seal 258, an inflation lumen is formed between the seal 258, the tubular body 210, and the inner elongate member. A pressurized fluid such as saline or a mixture containing a contrast agent can be introduced into the lumen 230 from the proximal end portion 212 of the tubular body 210, enters the interior 251 of the balloon 250 via the conduits or passages 234 in the wall of the tubular body 210 to inflate the balloon 250. The inner elongate member can be longitudinally moveable in the lumen 230 of the tubular body 210, and extendable through the opening end of the tubular body 210 to guide the lithotripsy device 200 or perform other medical procedures.

With reference to FIG. 2, the seal 258 can be formed by various suitable means such as thermal compression of a sealing material with a mandrel. By way of example, plural through-holes may be drilled or provided in the wall of the tubular body 210 e.g., near the distal tip portion 216. A mandrel having a notch or a recessed area may be placed in the lumen 230 of the tubular body 210. The recessed area of the mandrel may be positioned facing the through-holes in the tubular body 210. The sealing material can be pressed through the holes by thermal compression. The sealing material driven through the holes can be received in the recessed area of the mandrel, forming a seal 258 circumferentially around the inner surface 232 of the tubular body 210.

Figure 3:
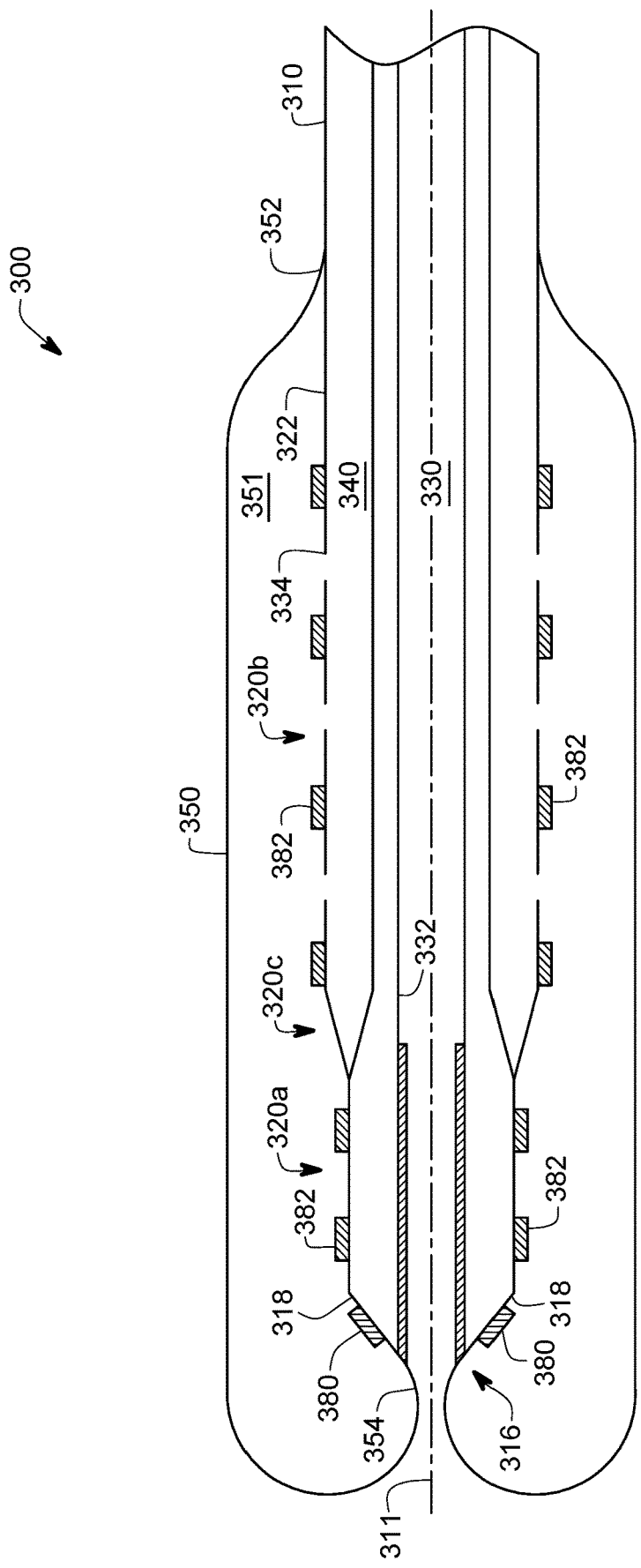
FIG. 3 illustrates a therapeutic end portion of an example lithotripsy device according to alternative embodiments of the disclosure.

With reference to FIG. 3, a lithotripsy device 300 according to alternative embodiments of the disclosure is now described. As shown, the example lithotripsy device 300 is similar to the lithotripsy device 200 shown in FIG. 2 in many aspects, except that the lithotripsy device 300 shown in FIG. 3 comprises a dual-lumen tubular body 310. The tubular body 310 comprises a first lumen 330 and a second lumen 340. The first lumen 330 of the tubular body 310 can be configured to receive an inner elongate member such as a guidewire, catheter, or other devices (not shown in FIG. 3) for guiding the lithotripsy device or performing other medical procedures. The second lumen 340 can be an annular lumen surrounding a portion of the the first lumen 330 and used to introduce a fluid to inflate the balloon 350. The second lumen 340 is in fluid communication with the interior or volume 351 defined by the balloon 350 via the conduits or passages 334. The tubular body 310 may comprise a tip portion 316 having one or more end surfaces 318 that form a non-zero angle with respect to the longitudinal axis 311 of the tubular body 310, a first generally cylindrical portion 320a adjacent to the tip portion 316, and a second generally cylindrical portion 320b proximal to the first generally cylindrical portion 320a. Between the first and the second generally cylindrical portions 320a, 320b is a tapered transition portion 320c. One or more emitters 380 may be positioned at the tip portion 316 (forward-facing emitters 380), and one or more emitters 382 may be positioned at each of the first cylindrical portion 320a and the second cylindrical portion 320b (side-facing emitters 382). The balloon 350 may enclose the forward-facing emitters 380 at the distal tip portion 316 and side-facing emitters 382 at the first and second cylindrical portions 320a, 320b. The proximal end portion 352 of the balloon 350 may be secured to the outer surface 322 of the tubular body 310 via bonding or other suitable means. The distal end portion 354 of the balloon 350 may be secured to the inner surface 332 of the tubular body 310 via bonding or other suitable means.

Figure 4:
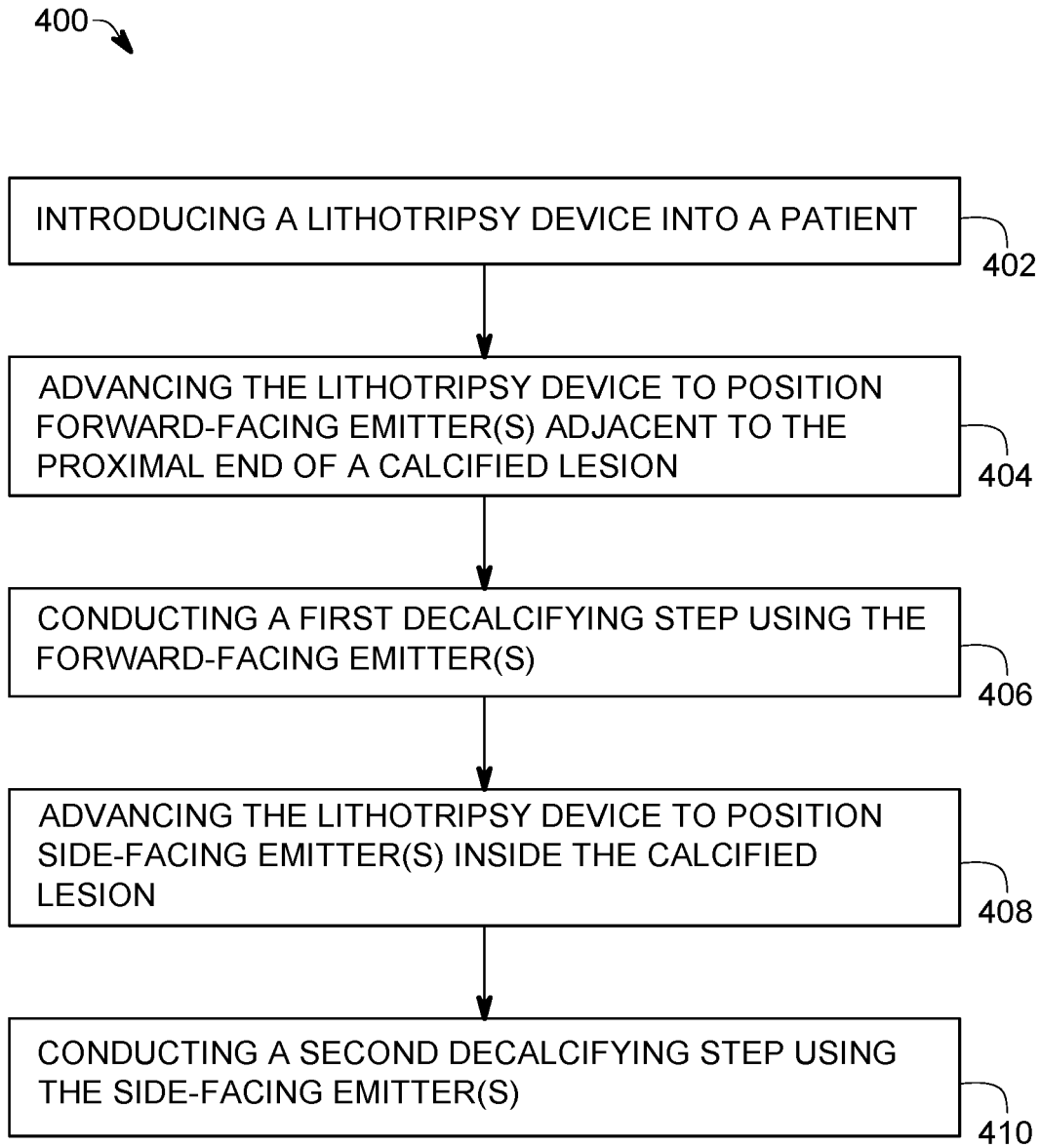
FIG. 4 is a flowchart illustrating steps of an example method for disintegrating a calcified lesion according to embodiments of the disclosure.

With reference now to FIG. 4, a method 400 of treating or disintegrating a calcified lesion is now described. The method 400 may start at step 402 where a lithotripsy device is introduced into a patient. By way of example, the lithotripsy device can be introduced into a vascular system of the patient through an entry vessel e.g., the femoral artery or inferior vena cava in the groin area. The lithotripsy device or the balloon of the lithotripsy device may be in a collapsed or deflated state when introduced into the patient. The lithotripsy device may be a lithotripsy device 200, 300 described above in conjunction with FIGS. 2-3 or any other suitable lithotripsy device. For example, the lithotripsy device may include an elongate tubular body comprising a tip portion having an end surface that forms a non-zero angle with a longitudinal axis of the tubular body and a generally cylindrical portion adjacent to the tip portion, a balloon circumferentially around a portion of the tubular body and enclosing the tip portion and the generally cylindrical portion. At least one emitter can be positioned at the end surface of the tip portion (forward-facing emitters) and one or more emitters be positioned at an outer surface of the generally cylindrical portion (side-facing emitters). The at least one forward-facing emitter and the one or more side-facing emitters can be configured to generate pressure waves in the fluid propagating through the balloon.

At step 404, the lithotripsy device is advanced to position the at least one forward-facing emitter at the tip portion of the device adjacent to the proximal end of a calcified lesion in the patient. The advancing, delivering, and positioning of the lithotripsy device in the vasculature of the patient can be assisted by a guidewire and viewed via e.g., x-ray fluoroscopy. Once the lithotripsy device is properly positioned proximate to the calcified legion, the balloon can be inflated by a pressured fluid such as a mixture of saline and a contrast agent injected via a port at the proximal end of the tubular body. The inflated balloon can contact or gently pressure against the proximal end portion of the calcified lesion.

At step 406, a first decalcifying step or procedure is conducted using the at least one forward-facing emitter at the tip portion of the device. Because the forward-facing emitters at the tip portion of the device can be controlled independently of the side-facing emitters at the cylindrical portion of the device, high voltage pulses from the energy source can be delivered only to the forward-facing emitters to perform the first decalcifying stage. Streams of pressure waves generated by the forward-facing emitters in the fluid may propagate through the balloon, breaking, disintegrating, or softening at least the proximal end portion of the calcified lesion.

At step 408, the lithotripsy device is advanced to position the side-facing emitters at the generally cylindrical portion inside the calcified lesion. The balloon may be deflated by drawing the inflation fluid out of the balloon to reduce the size of the lithotripsy device for further advancement. After the first calcifying step or procedure, at least the proximal end portion of the calcified lesion is disintegrated or softened, allowing the cylindrical portion of the lithotripsy device to cross at least a portion of the calcified lesion. Once the lithotripsy device is properly positioned inside the calcified lesion, the balloon can be inflated again by a pressured fluid. The inflated balloon can contact or gently pressure against the calcified lesion from inside of the calcified lesion. High voltage pulses from the energy source can be delivered to the side-facing emitters, which are positioned inside of the calcified lesion, to perform a second or subsequent decalcifying step or procedure on the calcified lesion, as indicated at step 410. Streams of pressure waves generated by the side-facing emitters in the fluid may propagate through the balloon, breaking or disintegrating the calcified lesion.

Various embodiments of balloon catheter guide have been described with reference to figures. It should be noted that an aspect described in conjunction with a particular embodiment is not necessarily limited to that embodiment and can be practiced in any other embodiments. The figures are intended for illustration of embodiments but not for exhaustive description or limitation on the scope of the disclosure. Alternative structures, components, and materials will be readily recognized as being viable without departing from the principle of the claimed invention.

All technical and scientific terms used herein have the meaning as commonly understood by one of ordinary skill in the art unless specifically defined otherwise. As used in the description and appended claims, the singular forms of "a," "an," and "the" include plural references unless the context clearly dictates otherwise. The term "or" refers to a nonexclusive "or" unless the context clearly dictates otherwise. The term "proximal" and its grammatically equivalent refers to a position, direction or orientation towards the user or physician's side. The term "distal" and its grammatically equivalent refers to a position, direction or orientation away from the user or physician's side. The term "first" or "second" etc. may be used to distinguish one element from another in describing various similar elements. It should be noted the terms "first" and "second" as used herein include references to two or more than two. Further, the use of the term "first" or "second" should not be construed as in any particular order unless the context clearly dictates otherwise. The order in which the method steps are performed may be changed in alternative embodiments. One or more method steps may be skipped altogether, and one or more optional steps may be included. All numeric values are provided for illustration and assumed to be modified by the term "about," whether or not explicitly indicated. The term "about" generally refers to a range of numbers that one of skill in the art would consider equivalent to the recited value e.g., having the same function or result. The term "about" may include numbers that are rounded to the nearest significant figure. The term "about" may be used to indicate a value that can include a variation of ±10% of the value modified by the term. The recitation of a numerical range by endpoints includes all numbers within that range.

Those skilled in the art will appreciate that various other modifications may be made. All these or other variations and modifications are contemplated by the inventors and within the scope of the invention.

What is claimed is:

1. A lithotripsy device, comprising:
an elongate body comprising a distal tip portion having an end surface that forms a non-zero angle with a longitudinal axis of the elongate body;

a balloon circumferentially around a portion of the elongate body and enclosing the end surface of the tip portion, the balloon defining an interior configured to receive a fluid; and at least one emitter positioned at the end surface of the tip portion of the elongate body, the at least one emitter being configured to generate pressure waves in the fluid propagating through the balloon to disintegrate a calcified lesion wherein the elongate body comprises a tubular body having an inner surface defining a first lumen, and wherein the balloon comprises a distal end portion secured to the inner surface of the tubular body.

2. The lithotripsy device of claim 1, wherein the end surface of the tip portion comprises a first end surface and a second end surface generally symmetrical with the first end surface, and the at least one emitter comprises a first emitter positioned at the first end surface and a second emitter positioned at the second end surface.

3. The lithotripsy device of claim 1, wherein the non-zero angle formed between the end surface and the longitudinal axis ranges from 20 to 70 degrees.

4. The lithotripsy device of claim 1, wherein the distal end portion of the balloon forms a seal circumferentially around the inner surface configured to fluid-tight seal an elongate member positioned within the seal.

5. The lithotripsy device of claim 1, wherein the balloon is forwardly and radially expandable when inflated with the fluid.

6. The lithotripsy device of claim 1, wherein the tubular body comprises a generally cylindrical portion adjacent to the tip portion, the generally cylindrical portion having an outer surface enclosed by the balloon, and wherein the lithotripsy device further comprises one or more emitters positioned at the outer surface of the generally cylindrical portion configured to generate pressure waves in the fluid.

7. The lithotripsy device of claim 6, wherein the at least one emitter positioned at the end surface of the tip portion is controllable independently of the one or more emitters positioned at the outer surface of the generally cylindrical portion.

8. The lithotripsy device of claim 1, wherein the balloon further comprises a proximal end portion, and a distensible portion, the proximal end portion being secured to an outer surface of the tubular body.

9. The lithotripsy device of claim 1, wherein the balloon further comprises a proximal end portion, and a distensible portion, the proximal end portion being secured to an outer surface of the tubular body, and wherein the tubular body further comprises a second lumen in fluid communication with the interior defined by the balloon.

10. The lithotripsy device of claim 9, wherein the second lumen comprises an annular lumen surrounding at least a portion of the first lumen.

11. The lithotripsy device of claim 1, wherein the first lumen has a diameter ranging from 0.017 inches to 0.042 inches.

12. A lithotripsy device, comprising:
an elongate tubular body comprising a distal tip portion having an end surface that forms a non-zero angle with a longitudinal axis of the elongate tubular body and a generally cylindrical portion adjacent to the tip portion;
a balloon circumferentially around a portion of the elongate tubular body and enclosing the tip portion and the generally cylindrical portion, the balloon defining an interior configured to receive a fluid; and
at least one emitter positioned at the end surface of the tip portion and one or more emitters positioned at an outer surface of the generally cylindrical portion, the at least one emitter and the one or more emitters being configured to generate pressure waves in the fluid propagating through the balloon to disintegrate a calcified lesion,
wherein the elongate tubular body comprises an inner surface defining a first lumen and an outer surface, the balloon comprises a distal end portion, a proximal end portion, and a distensible portion, the distal end portion being secured to the inner surface of the elongate tubular body and the proximal end portion being secured to the outer surface of the elongate tubular body.

13. The lithotripsy device of claim 12, wherein the at least one emitter positioned at the end surface of the tip portion is controllable independently of the one or more emitters positioned at the outer surface of the generally cylindrical portion.

14. The lithotripsy device of claim 12, wherein the elongate tubular body further comprises a second lumen in fluid communication with the interior defined by the balloon.

15. A lithotripsy device, comprising:
an elongate tubular body comprising a distal tip portion having an end surface that forms a non-zero angle with a longitudinal axis of the elongate tubular body and a generally cylindrical portion adjacent to the tip portion;
a balloon circumferentially around a portion of the elongate tubular body and enclosing the tip portion and the generally cylindrical portion, the balloon defining an interior configured to receive a fluid; and
at least one emitter positioned at the end surface of the tip portion and one or more emitters positioned at an outer surface of the generally cylindrical portion, the at least one emitter and the one or more emitters being configured to generate pressure waves in the fluid propagating through the balloon to disintegrate a calcified lesion,
wherein the balloon comprises a distal end portion secured to an inner surface of the elongate tubular body.

* * * * *